Figure 3:
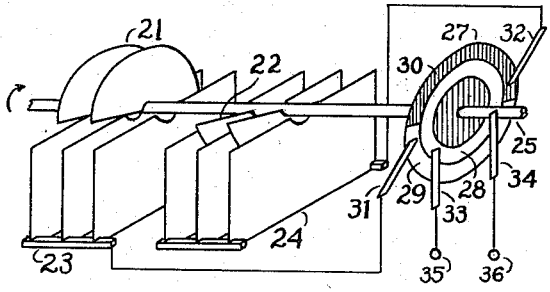

March 12, 1935.    O. H. SCHUCK, JR    1,994,232
WAVE ANALYZER
Filed Feb. 2, 1933    3 Sheets-Sheet 1
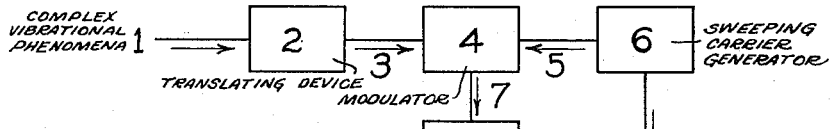
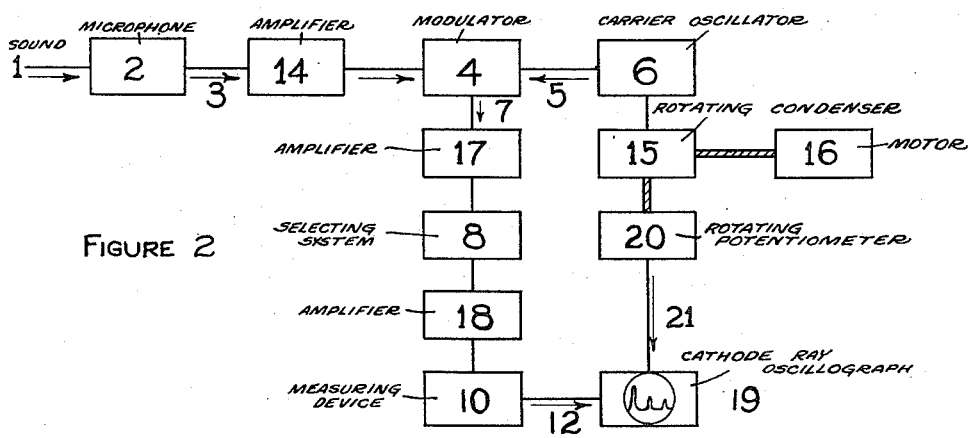
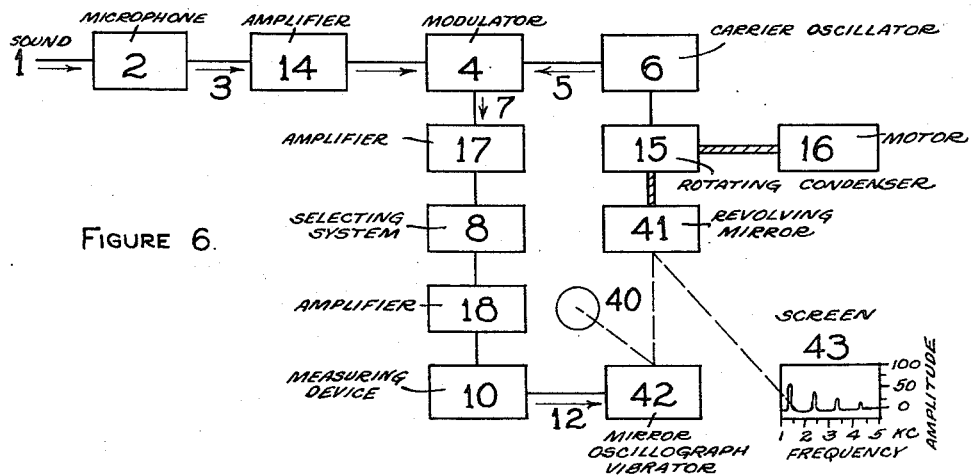
INVENTOR.
Oscar H. Schuck, Jr.
BY
Frank H. Borden
ATTORNEY.

INVENTOR.
Oscar H. Schuck, Jr
BY Frank H. Borden
ATTORNEY.

March 12, 1935.   O. H. SCHUCK, JR   1,994,232
WAVE ANALYZER
Filed Feb. 2, 1933   3 Sheets-Sheet 3

INVENTOR.
Oscar H. Schuck, Jr.
BY Frank H. Borden
ATTORNEY.

Patented Mar. 12, 1935

1,994,232

UNITED STATES PATENT OFFICE 1,994,232

WAVE ANALYZER

Oscar H. Schuck, Jr., Philadelphia, Pa.

Application February 2, 1933, Serial No. 654,832

20 Claims. (Cl. 181—0.5)

This invention relates to wave analyzers having particular reference to devices for visually and substantially instantaneously analyzing waves such as sound waves.

Many methods and devices for the analysis of vibratory phenomena, either acoustic, mechanical or electrical, into constituent frequency components have been devised. Up to the present time they have all had the disadvantage of being slow in use and therefore of requiring that the phenomena being studied remain steady for some length of time, the fastest heretofore taking about three minutes. This slowness is a great hindrance in many lines of investigation, as often the phenomena being studied is not steady for a sufficient length of time to enable an accurate analysis to be made. Vocal and instrumental tones, including the tones of percussion instruments and bells are examples of phenomena which do not remain steady, and of which it is highly desirable to obtain analyses. Even in an investigation of devices producing a vibratory phenomena to be studied which remains steady, it is often desired to determine the effects on the frequency analysis of changes and adjustments. By the methods of the prior art, this is tedious and time consuming and the results of analyses are in most cases not available until after photographic development.

It is the object of this invention to disclose a principle upon which devices for frequency analysis may be built, that will overcome the disadvantages of the prior art and will show to the eye a continuous, substantially instantaneous frequency analysis of the phenomena being studied. This analysis may also be recorded photographically or otherwise. The apparatus may be so arranged that the analyses of various frequency bands may be selected and studied at will.

This invention concerns the principle of a device for giving a substantially continuous and instantaneous analysis of any complex vibratory phenomena into its constituent frequency components, showing the frequency and relative or absolute amplitude of each component. The use of the word "substantially" in the previous sentence will be explained. There is a minimum time between successive separate events for our senses to perceive them as being separate and not continuous. The time lag or retentivity of vision of the eye is made use of in the case of the stroboscope and the cinema. If a spot of light traces a curve on a screen and continually repeats the tracing of the curve with sufficient rapidity of repetition, the eye will see the curve traced by the spot as a steady and continuous line of light on the screen. Any changes between successive traces will show as a change in the shape of the line of light and will be manifest to the brain as fast as the eye can see them and no faster. Any greater speed is unnecessary, since the change could not be perceived more quickly. The principle of such a device is to be described herein together with the description of one application thereof, which may be used to analyze any kind of vibratory phenomena where such phenomena may be expressed by any means as corresponding vibrations of electrical quantities. It is especially useful in the analysis of sound waves, electrical waves and mechanical vibrations.

*Principle.*—The principle of this device is based upon the use of the transient response of a selecting system to the components of the heterodyne beat note between the complex electric voltage wave representing the phenomena, which will hereinafter be referred to as the audio note, although its frequency components need not be limited to the audible range, and an alternating voltage wave whose frequency is caused to vary continuously and periodically between fixed limits or about a mean. This latter voltage will be referred to as the sweeping carrier. The modulation or hetrodyning of the sweeping carrier with the audio note may be accomplished by one or more vacuum tubes of any number of elements or by any other device. The resulting complex modulated current wave in which the sweeping carrier frequency may either be present or suppressed, is impressed upon a selecting system which will respond to only one very narrow band of frequencies, the pass band, to the exclusion of all others. This selecting system must have the characteristic that it will give only a single response to a pure alternating current wave whose frequency sweeps through the pass band. A single sharply tuned electrical circuit (or its mechanical or piezo electric analogs), or cascaded combinations of such circuits, give multiple responses to such a varying frequency, and to obtain a single response proportional to the amplitude of the impressed wave, it is necessary to use a number of tuned circuits, electrical, mechanical, acoustical or piezo-electrical, so coupled together as to show the characteristics of an electrical filter when measured statically, i. e. by the response to various constant frequency waves of succesively different frequencies. Any component of the modulated signal whose frequency lies within the pass band of the selector will cause a response whose magnitude depends on the amplitude of that component; the magnitude of the response may be measured or shown by some instrument such as a galvanometer, voltmeter, ammeter, vacuum tube voltmeter, with or without amplifier, or other suitable measuring device.

As the frequency of the sweeping carrier is varied, the modulation frequencies vary with it, each being caused to pass in turn through the pass band of the selecting system and causing a response of the selecting system and therefore an indication of the measuring device at that instant. The indications of the measuring device are arranged to produce movement of a recording or visually indicating device such as a pen or a light beam reflected from a mirror galvanometer or other suitable device to a screen or a cathode ray oscillograph beam. This movement is in one direction (say the Y direction) of a system of plane coordinates; movement in the other direction (say the X direction) is arranged to depend on some function of the instantaneous frequency of the sweeping carrier. There is thus traced on the screen a curve of a function of the response of the selecting system against a function of the instantaneous frequency of the sweeping carrier, which may be photographically or mechanically recorded or which may be observed visually.

The response of the selecting system depends upon the presence of and is proportional to the magnitude of a heterodyne beat note which is due to the modulation of the sweeping carrier by the complex audio note. Each frequency component present in the audio note will produce two beat note frequency components of interest here, of frequencies which are the sum and difference of the sweeping carrier frequency and the frequency of the audio component, and of amplitudes which are proportional to the products of the amplitude of the sweeping carrier and the amplitude of the audio component. If the amplitude of the sweeping carrier is constant, the amplitude of each beat note component will be proportional to the amplitude of the audio component. All other products of modulation may be eliminated by suitable design. The selecting system will show a response to a beat note frequency when the difference between its pass band frequency and the instantaneous frequency of the sweeping carrier is equal to the frequency of a component of the audio note, and as the frequency of the sweeping carrier approaches or recedes from the pass band frequency of the selector, the frequencies of the beat note components representing the various audio components will in turn pass through the pass band of the selector and will in turn produce responses of the selector whose maximum amplitudes are proportional to the amplitudes of the audio components. Since the frequency of the audio component is a direct function of the sweeping carrier frequency, the recording or visually indicating device may be calibrated to show a function of the amplitude of the audio component against a function of the frequency of the audio component; it may be arranged to show directly amplitude against frequency of component of the complex audio note. Strictly speaking, a curve which is the response curve of the selector will be traced for each component; however the height and position of its peak give respectively the magnitude and frequency of the component. The rate of sweep of the frequency of the sweeping carrier may have any value convenient to the operation of the recording device or it may be great enough to cause retentivity of vision to allow the path of the spot of light on the screen of the visually indicating device to be seen as a continuous line of light. The need for the requisite speed for retentivity of vision to allow the path of the spot of light to be seen as a continuous steady line could be obviated if a chemically or otherwise treated screen were used which would remain luminous for a predetermined period of time after being exposed to the spot of light. Such a screen could be made of phosphorescent zinc sulphide powder held in a suitable binder such as sodium silicate or collodion varnish.

The response of a selecting system, both in amplitude and frequency of pass band to a sweeping frequency depends upon the speed of sweep; the most convenient arrangement is therefore to have a sweeping carrier of constant amplitude whose rate of change of frequency is constant. A separate amplitude and frequency calibration is necessary for each speed of sweep.

Figure 4:
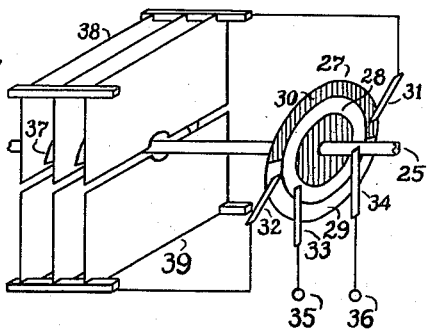
Figure 5:
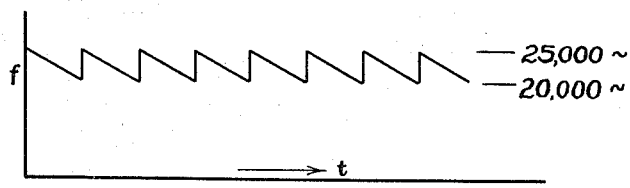
Figure 7:
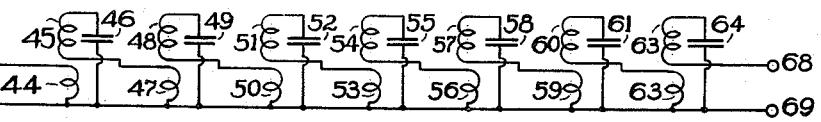
Figure 8:
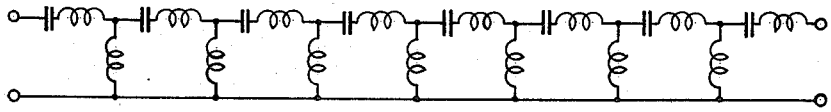
Figure 9:
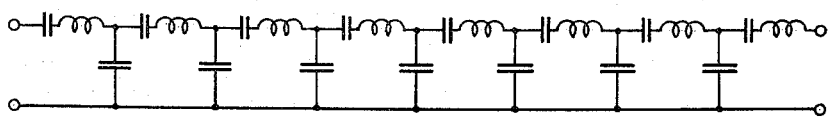
Figure 10:
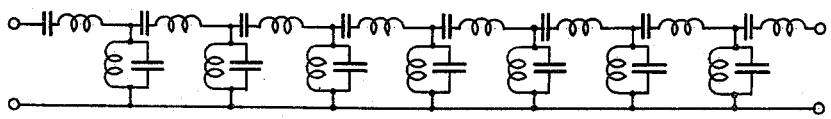
Figure 11:
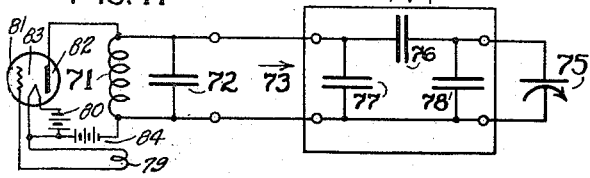
Figure 12:
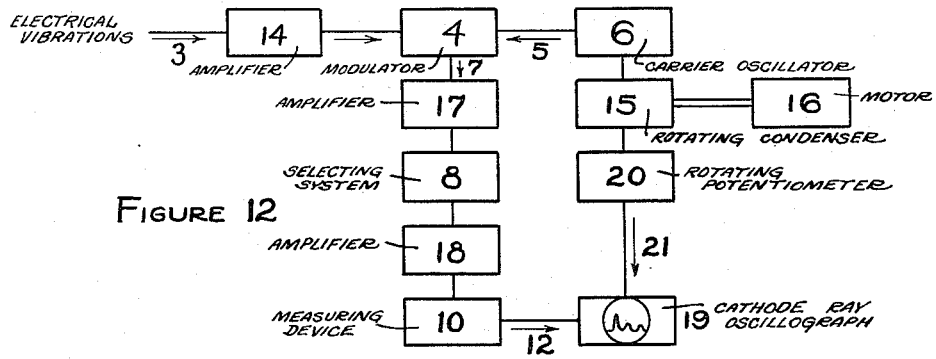
Figure 13:
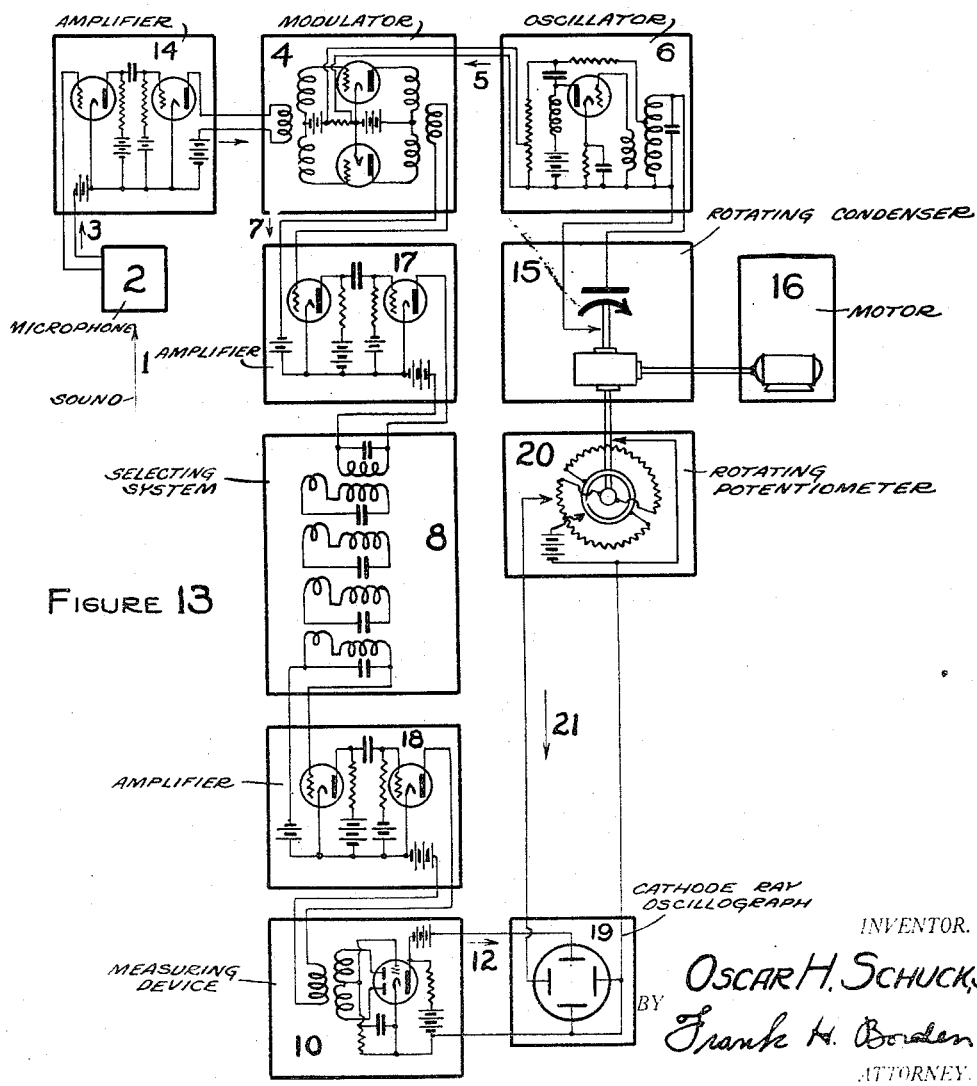

In the accompanying drawings:

Fig. 1 is a functional diagram showing the general connections of a device for wave analysis utilizing the principles described above, Fig. 2 is a functional diagram showing the connections of a device for sound wave analysis utilizing the principles described above and giving its indications visually on the screen of a cathode ray oscillograph, Fig. 3 is a diagram of a rotating interleaving multiplate condenser with synchronous switch which is used as part of the circuit of a vacuum tube oscillator to vary its frequency with rotation of the rotating condenser as desired, Fig. 4 is a similar diagram of a modified design of condenser used to vary the frequency of a vacuum tube oscillator, Fig. 5 is a graph showing the variation of frequency of the carrier frequency with time in the device for sound analysis illustrated in Fig. 2, Fig. 6 is a functional diagram showing the connections of a device for sound wave analysis utilizing the principles described above and utilizing a deflecting mirror type oscillograph, the indications of the device being given visually on a screen or arranged to make photographic records, Fig. 7 is a wiring diagram of an electrical form of frequency selective device suitable for use in a device for wave analysis, Figs. 8, 9 and 10 are wiring diagrams of other electrical forms of frequency selective devices suitable for use in devices for wave analysis, Fig. 11 is a wiring diagram of a quadripole or four terminal electrical network in the circuit of a vacuum tube oscillator as a means of obtaining a desired variation of frequency with rotation of the rotating condenser, Fig. 12 is a wiring diagram illustrating the application of the principles described above to electric wave analysis, and Fig. 13 is a wiring and functional diagram showing the connection of apparatus in the device particularly relevant to the application of the principles described above to sound wave analysis.

Figs. 1, 2 and 6 are functional diagrams to illustrate the principle herein described. The construction of pieces of apparatus to perform the various described functions is known in the art, so their wiring diagrams are not shown, since it is the application of the principle to their combination that it is desired to show. The blocks represent pieces of apparatus having the functions described below, and the lines connecting them represent means for transferring vibratory energy or mechanical motion from one to another.

The principle of the invention is illustrated by the functional diagram of Fig. 1. The complex vibrational phenomena 1 is translated by the translating device 2 into corresponding electrical vibrations (hereinafter for convenience designated as the audio note vibrations 3, although they need not lie either partly or entirely within the range of audible frequencies); these are impresed on the modulator 4 and modulate the sweeping carrier 5 produced by the sweeping carrier generator 6. The products of modulation 7 are impressed upon the selecting system 8 whose responses 9 are indicated by the measuring device 10 and cause movement of the recording or visually indicating device 11, in the Y direction, through the electrical, mechanical or other coupling 12, while movement in the X direction is produced as a function of the frequency of the sweeping carrier through the electrical, mechanical or other coupling 13 with the sweeping carrier generator 6.

A particular application of the principle of the instantaneous wave analyzer will now be described. This device which has been built and has been in successful operation is designed to show on a screen the frequency spectrum of a sound wave, and is called the "sound prism".

In Fig. 2, the sound wave 1 in the air is translated into an electrical wave 3 by the microphone 2, is amplified by the amplifier 14 and lead to the modulator 4, where it modulates the sweeping carrier 5 generated by the carrier oscillator 6 whose frequency is determined by the position of the rotating air condenser 15 which is mechanically driven by the motor 16. The heterodyne beat note 7, consisting of sum and difference frequencies only, the sweeping carrier having been suppressed, is amplified by the amplifier 17 and impressed upon the selector 8 which in this case is an electrical filter passing a 100 cycle band at 20,000 cycles. The responses of the filter are amplified by the amplifier 18, led to the measuring device 10 which in this case comprises a rectifier, and impressed as a voltage 12 across the vertical deflecting plates of the cathode ray oscillograph 19. The horizontal deflection is produced by a voltage 21 taken from the rotating potentiometer 20 which is mechanically coupled to the rotating condenser 15. For the arrangement which analyzes tones for frequencies between zero and 5,000 cycles, the carrier oscillator circuit elements and the shape of the rotating condenser plates are so adjusted that with uniform speed of rotation of the condenser the carrier frequency decreases uniformy from 25,000 cycles to 20,000 cycles in one half revolution of the condenser shaft as the rotor plates enmesh with the stator plates, while the spot of light on the cathode ray oscillograph screen moves uniformly across the width of the screen, so that the frequency spectrum is traced. When the carrier frequency reaches 20,000 cycles, corresponding to zero audio component, a synchronous switch attached to the condenser shaft changes the condenser connections so that the sweeping carrier frequency becomes 25,000 cycles and begins to repeat its uniform downward sweep. At the same time the voltage across the horizontal deflecting plates of the cathode ray oscillograph is changed by the rotating potentiometer so that the spot begins again its motion across the screen. A complete sweep is made in a tenth of a second and continuously repeated, so that the line traced by the moving spot is seen by the eye as a continuous, steady line of light.

The condenser arrangement for instantly changing the frequency is shown in Fig. 3. Two identical condensers are used, the plates of the rotors 21 and 22 being cut to such a shape as each give, with uniform rotation, a linear change of frequency from 25,000 cycles to 20,000 cycles as the rotor turns from its completely unmeshed to its completely meshed position with the respective stators 23 and 24. Connections to the oscillator 35 and 36 are made respectively to the rotors through brush 34 and shaft 25 and to one of the stators at a time through a synchronous switch consisting of insulating disc 27 fastened to and rotating with the shaft 25, on which is fastened a metallic ring 28 on which bears brush 33. The metallic ring has a connection to a conducting half ring 29 with which one or the other of the brushes 31 and 32 make contact, depending upon the position of the conducting half ring. In operation, as rotor 21 begins to enmesh stator 23 in the direction indicated, it is connected to the oscillator through brush 31, half ring 29, ring 28 and brush 33. When it is completely enmeshed, brush 31 leaves half ring 29 and brush 32 makes contact with half ring 29, thus connecting into the circuit stator 24 into which rotor 22 is just beginning to mesh. The resulting variation of sweeping carrier frequency against time is shown in Fig. 5.

Another method for obtaining this frequency variation with a rotating condenser is shown in Fig. 4. Only one rotor 37 is used, and the two stators 38 and 39 are mounted so that the rotor enmeshes each in turn. The synchronous switch 40 is arranged to connect terminal 35 to that stator which rotor 37 is entering.

The frequency range of the sweeping carrier may be altered to give other audio ranges. This may be accomplished by the use of other suitably shaped rotating condensers to give the desired ranges, with means for switching the proper condenser or condensers into the circuit, or it may be done by the use of suitable combinations of condensers or inductors, used in combination with one or more rotating condensers to give the desired ranges. One method for obtaining a number of ranges with but one rotating condenser is shown in Fig. 11. An electrical oscillatory circuit is part of a conventional electron discharge tube oscillator circuit, a typical form of which is shown. It includes an electron discharge tube containing grid 81, anode 82 and cathode 83, supplied the proper currents and potentials by filament battery 80 and anode batetry 84, and a grid pick up coil 79. The electrical oscillatory circuit consists of an inductance 71 with distributed capacitance represented by a shunt condenser 72, in parallel with which is the effective capacitance 73 of the quadripole, or four terminal network, represented by 74, and the capacitance of the rotating condenser 75. The quadripole in this case consists of series 76 and shunt 77, 78 capacitances, any of which may zero or infinite, of the proper values to give the desired frequency variation of the oscillator with rotation of the rotating condenser 75. A separate quadripole is connected into the circuit for each range. The same effect could be produced by suitable switching to modify the elements of one quadripole, or inductances could be substituted for one or more of the condensers, or any other kind of network containing condensers and inductances could be used. Instead of changing the frequency of the vacuum tube oscillator by variation of capacitance of the tuned circuit, the inductance may be varied by suitable means, as by a rotating or reciprocating variable inductance or variometer, or by variation of resistance in the circuit, such as variation of the plate resistance of the vacuum tube. Other means for producing the carrier frequency could be used, such as a mechanically vibrating system with means for continuously varying its frequency of vibration, as by shortening a vibrating spring.

Another arrangement of the visually indicating part of the sound prism is shown in Fig. 6. The cathode ray oscillograph of the previous arrangement is replaced by a mirror oscillograph vibrator 42 which reflects a beam of light from light source 40 to rotating or rocking mirror 41 which is mechanically coupled to the rotating condenser, and then to the viewing screen 43. The mirror 41 is arranged to cause the spot of light to move uniformly across the screen 43 as the carrier frequency changes. For photographic records a sensitive film is substituted for the screen or a mirror or prism is arranged to deflect the light to a film. By the latter means it is possible to obtain a photographic record without interrupting the visual observations.

The selector used in the "sound prism" consists of a chain of sharply tuned circuits, very loosely coupled, as shown in Fig. 7. The input is to coil 44, to which the tuned circuit consisting of inductance 45 and 47 and capacitance 46 is inductively coupled. Inductive coupling to the next circuit is obtained with coil 47, and so on in like manner through the whole chain to the output terminals 68 and 69.

Other circuits which could be used in the selector are shown in Figs. 8, 9 and 10. Electrical circuits are shown, but their acoustical, mechanical or piezo-electric analogs may be used for the selector as well as for any of the other pieces of apparatus whose function has been mentioned. For instance, modulation may be accomplished through magnetic non-linearity (E. Peterson—Bell System Technical Journal: 7, 762, 1928), through chemical rectification (Eisner, Rahm and Schuchmann—E. N. T.: 9, 323, 1932) or other means; the continuous variation of carrier frequency may be accomplished by the shortening of a vibrating string, the action being similar to that of sliding the finger along a vibrating violin string, and so on.

Another application of the principle would be to a device for analyzing the output current or voltage of any kind of electrical apparatus. The connections would be as shown in Fig. 12, the microphone 2 of Fig. 2 being omitted and the electrical vibrations 3 to be analyzed being led directly to the amplifier 14, the rest of the process being exactly as described above for the "sound prism".

The scope of this invention is not limited to any particular forms of selector or other parts of the apparatus but is intended to cover all applications of the use of transient response to a heterodyne vibration of changing frequency in wave analysis, and the combination of such response with means for indicating visually and recording the analysis.

I claim:

1. In a device for analyzing vibration, a frequency selector, means for impressing on the frequency selector a complex heterodyne vibration which is the heterodyne combination of the vibration to be analyzed and a locally generated vibration whose frequency is automatically varied in a predetermined manner, means for measuring the amplitudes of the responses of the frequency selector, and indicating means continuously responsive to both the amplitude measurement and the frequency of the locally generated vibration to visually indicate the frequencies and amplitudes of the components of the vibration being analyzed.

2. In a device for analyzing vibration, a frequency selector capable of giving a single transient response peak to a vibration whose frequency is caused to pass in a smooth and continuous manner through its frequency selective band, means for impressing on the frequency selector a complex heterodyne vibration which is the heterodyne combination of the vibration to be analyzed and a locally generated vibration whose frequency is automatically varied in a predetermined manner, means for measuring the amplitudes of the responses of the frequency selector, and indicating means continuously responsive to both the amplitude measurement and the frequency of the locally generated vibration to visually indicate the frequencies and amplitudes of the components of the vibration being analyzed.

3. In a device for analyzing vibration, a frequency selector capable of giving a single transient response peak to a vibration whose frequency is caused to pass in a smooth and continuous manner through its frequency selective band, means for impressing on the frequency selector a complex heterodyne vibration which is the heterodyne combination of the vibration to be analyzed and a locally generated vibration whose frequency is automatically varied in a predetermined manner, said means including a modulator comprising a non-linear translating system together with means for impressing thereon the vibration and means for deriving thereupon the resultant complex heterodyne vibration and impressing it upon the frequency selector, means for measuring the amplitudes of the responses of the frequency selector, and indicating means continuously responsive to both the amplitude measurement and the frequency of the locally generated vibration to visually indicate the frequencies and amplitudes of the components of the vibration being analyzed.

4. In a device for analyzing vibration, a frequency selector capable of giving a single transient response peak to a vibration whose frequency is caused to pass in a smooth and continuous manner through its frequency selective band, means for impressing on the frequency selector a complex heterodyne vibration which is the heterodyne combination of the vibration to be analyzed and a locally generated vibration whose frequency is automatically and repeatedly varying its frequency in a predetermined manner, means for measuring the amplitudes of the responses of the frequency selector, and indicating means continuously responsive to both the amplitude measurement and the frequency of the locally generated vibration to visually indicate the frequencies and amplitudes of the components of the vibration being analyzed.

5. In a device for analyzing vibration, a translating means arranged to translate the vibration to be analyzed into a corresponding vibration of a different form of vibrational energy, a frequency selector capable of giving a single transient response peak to a vibration whose frequency is caused to pass in a smooth and continuous manner through its frequency selective band, means for impressing on the frequency selector a complex heterodyne vibration which is the heterodyne combination of the vibration derived by the translating means from the vibration to be analyzed and a locally generated vibration whose frequency is automatically varied in a predetermined manner, means for measuring the amplitudes of the responses of the frequency selector, and indicating means continuously responsive to both the amplitude measurement and the frequency of the locally generated vibration to visually indicate the frequencies and amplitudes of the components of the vibration being analyzed.

6. In a device for analyzing vibration, a translating means arranged to translate the vibration to be analyzed into a corresponding vibration of a different form of vibrational energy, a frequency selector capable of giving a single transient response peak to a vibration whose frequency is caused to pass in a smooth and continuous manner through its frequency selective band, means for impressing on the frequency selector a complex heterodyne vibration which is the heterodyne combination of the vibration derived by the translating means from the vibration to be analyzed and a locally generated vibration whose frequency is automatically varied in a predetermined manner, means for measuring the amplitudes of the responses of the frequency selector, and recording means continuously responsive to both the amplitude measurement and the frequency of the locally generated vibration to record the frequencies and amplitudes of the components of the vibration being analyzed.

7. In a device for analyzing vibration, a translating means arranged to translate the vibration to be analyzed into a corresponding vibration of a different form of vibrational energy, a frequency selector capable of giving a single transient response peak to a vibration whose frequency is caused to pass in a smooth and continuous manner through its frequency selective band, means for impressing on the frequency selector a complex heterodyne vibration which is the heterodyne combination of the vibration derived by the translating means from the vibration to be analyzed and a locally generated vibration whose frequency is automatically varied in a predetermined manner, means for measuring the amplitudes of the responses of the frequency selector, and indicating means continuously responsive to both the amplitude measurement and the frequency of the locally generated vibration to visually indicate the frequencies and amplitudes of the components of the vibration being analyzed, together with recording means continuously responsive to both the amplitude measurement and the frequency of the locally generated vibration to record the frequencies and amplitudes of the components of the vibration being analyzed.

8. In a device for analyzing sound vibration, a translating means arranged to translate the sound vibration to be analyzed into corresponding vibration of a different form of vibrational energy, a frequency selector capable of giving a single transient response peak to a vibration whose frequency is caused to pass in a smooth and continuous manner through its frequency selective band, means for impressing on the frequency selector a complex heterodyne vibration which is the heterodyne combination of the vibration derived by the translating means from the vibration to be analyzed and a locally generated vibration whose frequency is automatically varied in a predetermined manner, means for measuring the amplitudes of the responses of the frequency selector, and indicating means continuously responsive to both the amplitude measurement and the frequency of the locally generated vibration to visually indicate the frequencies and amplitudes of the components of the sound vibration being analyzed.

9. In a device for analyzing vibration, a translating means arranged to translate the vibrations to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the vibration to be analyzed and a locally generated electrical vibration whose frequency is automatically varied in a predetermined manner, means for measuring the amplitudes of the responses of the frequency selector, and indicating means continuously responsive to both the amplitude measurement and the frequency of the locally generated electrical vibration to visually indicate the frequencies and amplitudes of the components of the vibration being analyzed.

10. In a device for analyzing vibration, a translating means arranged to translate the vibrations to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the vibration to be analyzed and a locally generated electrical vibration whose frequency is automatically varied in a predetermined manner, means for measuring the amplitudes of the responses of the frequency selector, and recording means continuously responsive to both the amplitude measurement and the frequency of the locally generated electrical vibration to record the frequencies and amplitudes of the components of the vibration being analyzed.

11. In a device for analyzing vibration, a translating means arranged to translate the vibrations to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the vibration to be analyzed and a locally generated electrical vibration whose frequency is automatically varied in a predetermined manner, means for measuring the amplitudes of the responses of the frequency selector, and indicating means continuously responsive to both the amplitude measurement and the frequency of the local generated electrical vibration to visually indicate the frequencies and amplitudes of the components of the vibration being analyzed, together with recording means continuously responsive to both the amplitude measurement and the frequency of the locally generated vibration to record the frequencies and amplitudes of the components of the vibration being analyzed.

12. In a device for analyzing sound vibration, a translating means arranged to translate the sound vibration to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the sound vibration to be analyzed and a locally generated electrical vibration whose frequency is automatically varied in a predetermined manner, means for measuring the amplitudes of the responses of the frequency selector, and indicating means continuously responsive to both the amplitude measurement and the frequency of the locally generated electrical vibration to visually indicate the frequencies and amplitudes of the components of the vibration being analyzed.

13. In a device for analyzing sound vibration, a translating means arranged to translate the sound vibration to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the sound vibration to be analyzed and a locally generated electrical vibration whose frequency is automatically varied in a predetermined manner, means for measuring the amplitudes of the responses of the frequency selector, and recording means continuously responsive to both the amplitude measurement and the frequency of the locally generated electrical vibration to record the frequencies and amplitudes of the components of the vibration being analyzed.

14. In a device for analyzing sound vibration, a translating means arranged to translate the sound vibration to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the sound vibration to be analyzed and a locally generated electrical vibration whose frequency is automatically varied in a predetermined manner, means for measuring the amplitudes of the responses of the frequency selector, and indicating means continuously responsive to both the amplitude measurement and the frequency of the locally generated electrical vibration to visually indicate the frequencies and amplitudes of the components of the vibration being analyzed, together with recording means continuously responsive to both the amplitude measurement and the frequency of the locally generated electrical vibrator to record the frequencies and amplitudes of the components of the sound vibration being analyzed.

15. In a device for analyzing vibration, a translating means arranged to translate the vibration to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the vibration to be analyzed and a locally generated electrical vibration whose frequency is automatically varied in a predetermined manner, means for producing the locally generated electrical vibration including means for automatically varying its frequency in a predetermined manner comprising a motor-driven rotating interleaving multiplate electrical condenser whose plates are so shaped and the connections to different parts of which are so arranged that the desired predetermind variation of frequency with time is obtained, means for measuring the amplitudes of the responses of the frequency selector, and indicating means continuously responsive to both the amplitude measurement and the frequency of the locally generated electrical vibration to visually indicate the frequencies and amplitudes of the components of the vibration being analyzed.

16. In a device for analyzing vibration, a frequency selector capable of giving a single transient response peak to a vibration whose frequency is caused to pass in a smooth and continuous manner through its frequency selective band, means for impressing on the frequency selector a complex heterodyne vibration which is the heterodyne combination of a vibration corresponding to the vibration to be analyzed and a locally generated vibration whose frequency is automatically varied in a predetermined manner, means for measuring the responses of the frequency selector, and indicating means continuously responsive to both the amplitude measurement and the frequency of the locally generated vibration to visually indicate by the tracing of a curve on a phosphorescent screen by a spot of light the frequencies and amplitudes of the components of the vibration being analyzed.

17. In a device for analyzing vibration, a translating means arranged to translate the vibration to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the vibration to be analyzed and a locally generated electrical vibration whose frequency is automatically varied in a predetermined manner, means for producing the locally generated electrical vibration including means for automatically varying its frequency in any selected one of a plurality of predetermined manners within predetermined ranges together with means for selecting at will a particular predetermined manner and range for the purpose of enabling the analysis of the vibration to be analyzed to be performed and indicated over any desired one of a number of predetermined frequency ranges, means for measuring the amplitudes of the responses of the frequency selector, and indicating means continuously responsive to both the amplitude measurement and the frequency of the locally generated electrical vibration to visually indicate the frequencies and amplitudes of the components of the vibration being analyzed.

18. In a device for analyzing vibration, a frequency selector capable of giving a single transient response peak to a vibration whose frequency is caused to pass in a smooth and continuous manner through its frequency selective band, means for impressing on the frequency selector a complex heterodyne vibration which is the heterodyne combination of a vibration corresponding to the vibration to be analyzed and a locally generated vibration whose frequency is automatically varied in a predetermined manner, means for measuring the responses of the frequency selector, and indicating means continuously responsive to both the amplitude measurement and the frequency of the locally generated vibration to visually indicate the frequencies and amplitudes of the components of the vibration being analyzed, recording means continuously responsive to both the amplitude measurement and the frequency of the locally generated electrical vibration to record the frequencies and amplitudes of the components of the vibration being analyzed, the visually indicating and the recording means being selectively alternatively rendered operative.

19. In a device for analyzing vibration, a translating means arranged to translate the vibration to be analyzed into a corresponding electrical vibration, a frequency selector capable of giving a single transient response peak to an electrical vibration whose frequency is caused to pass in a smooth and continuous manner through its frequency selective band, means for impressing on the frequency selector a complex heterodyne electrical vibration which is the heterodyne combination of the electrical vibration derived by the translating means from the vibration to be analyzed and a locally generated electrical vibration whose frequency is automatically varied in a predetermined manner, means for producing the locally generated electrical vibration including means for automatically varying its frequency in any selected one of a plurality of predetermined manners within predetermined ranges together with means for selecting at will a particular predetermined manner and range for the purpose of enabling the analysis of the vibration to be analyzed to be performed and indicated over any desired one of a number of predetermined frequency ranges, means for measuring the amplitudes of the responses of the frequency selector, and indicating means continuously responsive to both the amplitude measurement and the frequency of the locally generated electrical vibration to visually indicate the frequencies and amplitudes of the components of the vibration being analyzed, recording means continuously responsive to both the amplitude measurement and the frequency of the locally generated electrical vibration to record the frequencies and amplitudes of the components of the vibration being analyzed, the visually indicating and the recording means being selectively alternatively rendered operative.

20. In a device for analyzing vibrations, translating means, a modulator, means for delivering to the modulator from the translating device vibrational energy corresponding to the vibrations being analyzed, means for impressing on the modulator vibrational energy of varying frequency, means for selecting a predetermined band of frequencies from the heterodyne output of the modulator, means for measuring the substantially instantaneous amplitude of the energy in the predetermined band of frequencies, and indicating means continuously responsive to both the amplitude measurements and the varying frequency to visually indicate the frequencies and amplitudes of the components of the vibrational energy entering the modulator.

OSCAR H. SCHUCK, Jr.